United States Patent
Bach

(10) Patent No.: US 8,059,890 B2
(45) Date of Patent: Nov. 15, 2011

(54) METHOD FOR IMPLEMENTING N-DIMENSIONAL OBJECT RECOGNITION USING DYNAMIC ADAPTIVE RECOGNITION LAYERS

(76) Inventor: Klaus J. Bach, Hockenheim (DE)

(*) Notice: Subject to any disclaimer, the term of this patent is extended or adjusted under 35 U.S.C. 154(b) by 1087 days.

(21) Appl. No.: 11/879,001

(22) Filed: Jul. 13, 2007

(65) Prior Publication Data

US 2007/0258649 A1    Nov. 8, 2007

Related U.S. Application Data

(63) Continuation-in-part of application No. 11/072,880, filed on Mar. 4, 2005, now abandoned.

(51) Int. Cl.
G06K 9/62 (2006.01)
G06K 9/46 (2006.01)
G06K 9/68 (2006.01)

(52) U.S. Cl. .................... 382/155; 382/190; 382/227

(58) Field of Classification Search .................. 382/155, 382/190, 227
See application file for complete search history.

(56) References Cited

U.S. PATENT DOCUMENTS 4,355,301 A * 10/1982 Isshiki et al. .................. 382/196
4,975,975 A * 12/1990 Filipski ......................... 382/227

* cited by examiner

*Primary Examiner* — Kathleen Y Dulaney
(74) *Attorney, Agent, or Firm* — Klaus J. Bach

(57) ABSTRACT

In a method and a system for the implementation of multi-layered network object recognition in multi-dimensional space, the structure of a neural recognition network is dynamically generated and adapted to recognize objects. The layers of the network are capable of recognizing key features of the input data by using evaluation rules to establish a hierarchical structure that is independent of data position and orientation, and can adapt varying data densities, geometrical scaling, and faulty or missing data. Adjacent layers of the hierarchy are mutually reinforcing to facilitate the convergence of a solution. Information flow is both bottom-up and top-down during the recognition process providing feedback from higher hierarchical layers to lower layers to cascade the results of higher-level recognition decisions to elements in lower layers.

10 Claims, 6 Drawing Sheets

| Layer | Appearance | Object | Most Intelligent Feature | Parameters | Field Shape |
|---|---|---|---|---|---|
| 1 | | Point | Position | Position $\vec{W} = \{X, Y, Z\}$ | None |
| 2 | | Surface Patch | Normal vector | Position of Centroid $\vec{W} = \{X, Y, Z\}$ Normal vector $\hat{N}$ | Sphere having receptive field radius |
| 3 | | Spatial Fragment<br>• Cylindrical Segment<br>• Edge Segment<br>• Flat Segment<br>• Hemispherical Segment | Curvature, Corner angles | Position of Origin $\vec{W} = \{X, Y, Z\}$<br>Axis, Normal vectors $\hat{A}, \hat{N}$<br>Curvature or Angle $K$<br>Fuzzy polarization vector $\hat{Q}$ | Receptive field-limited geometry |
| 4 | | Primitive<br>• Steel Beam<br>• Tubular Elbow<br>• Long Tube<br>• Edge-bounded Face | Distinguishable shape or profile | Position of Origin $\vec{W} = \{X, Y, Z\}$<br>Axis, Normal vectors $\hat{A}, \hat{N}$<br>Simple shape/profile parameters and/or length parameter as required by context<br>Fuzzy polarization vector $\hat{Q}$ | Geometry-parameter-limited field |
| 5 | | Engineering Element<br>• Pipework branch<br>• Vessel or Equipment<br>• Steel or Concrete Structure<br>• Further entities as required by application context | Physical component | Position of Origin $\vec{W} = \{X, Y, Z\}$<br>Axis, Normal vectors $\hat{A}, \hat{N}$<br>Complex geometric definition parameters as required by context<br>Fuzzy polarization vector $\hat{Q}$ | Functionality based grouping |

Figure 3 Definition of the recognition cells of the various layers in the preferred embodiment.

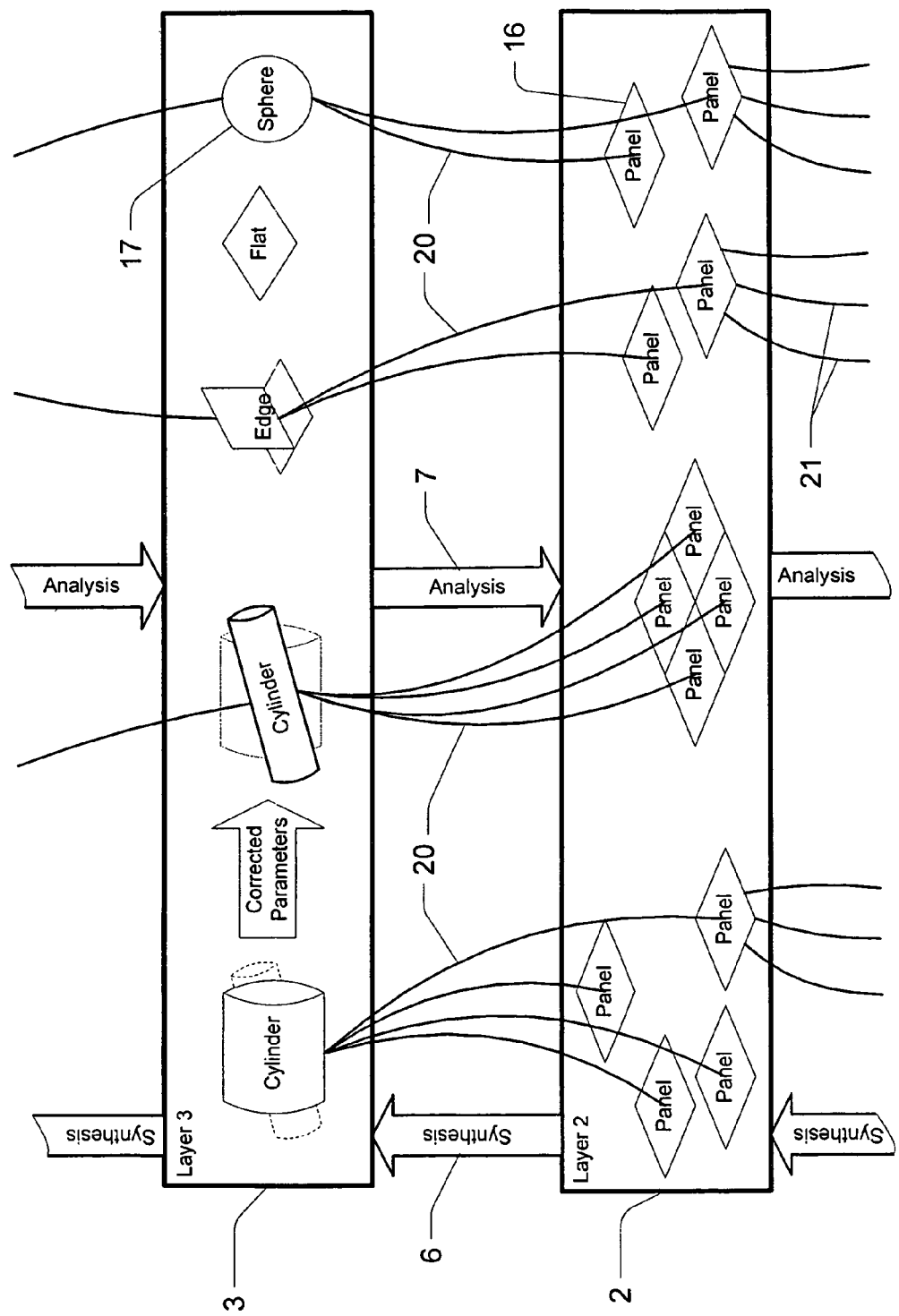
Figure 4. Bottom-up and top-down information flow in the recognition and confirmation of a layer 3 object based on a subset of layer 2 objects.

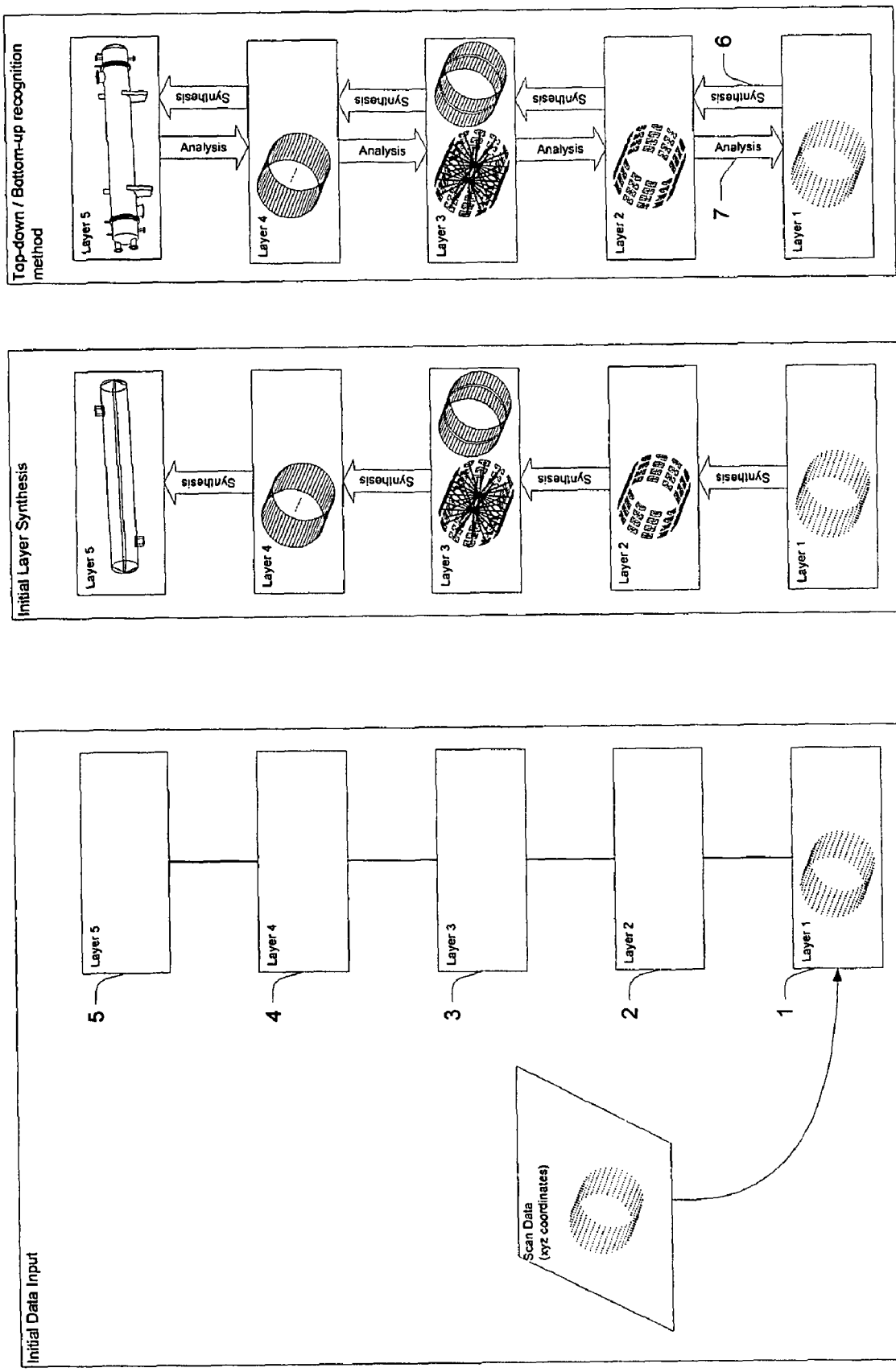
Figure 5 Synthesis and analysis steps involved in the recognition process and the final finishing stage.

Figure 6a and Fig. 6b. Improvement in the recognition results after applying top-down bottom-up information flow to a poorly posed case made up of three pipes positioned too closely for simple direct recognition.

METHOD FOR IMPLEMENTING N-DIMENSIONAL OBJECT RECOGNITION USING DYNAMIC ADAPTIVE RECOGNITION LAYERS

This is a continuation-in-part application of Ser. No. 11/072,880 filed Mar. 4, 2005

REFERENCES CITED

U.S. Patent Documents

| | | | |
|---|---|---|---|
| 4,355,301 | October 1982 | Isshiki | Optical character reading system |
| 4,975,975 | December 1990 | Filipski | Hierarchical parametric apparatus and method for recognizing drawn characters |
| 5,295,198 | March 1994 | Maney | Pattern identification by analysis of digital words |
| 5,511,134 | April 1996 | Kuratomi | Image recognition device and image recognition method |
| 5,680,481 | October 1997 | Prasad | Facial feature extraction method and apparatus for a neural network acoustic and visual speech recognition system |

Other References

"Handwritten Alphanumeric Character Recognition by the Neocognitron" by Fukushima and Wake, IEEE Transactions on Neural Networks, Vol 2 No. 3, May 1991, pp. 355-365.

BACKGROUND OF THE INVENTION

The invention relates to a method and system for implementing successive multi-layered feature recognition in multi-dimensional space in which recognition cells are dynamically generated to accommodate the input data and are adapted during the recognition process, wherein the recognition cells are structured into groups which have specific recognition features assigned to them.

Three-dimensional laser scan data generated in an industrial plant setting for the purposes of documentation, computation, and analysis has a usefulness that is directly related to the degree or complexity of recognition, the so-called intelligence. For example, recognizing the mere presence of a surface is accomplished by a laser scan, but is not very useful; to recognize that surface as a part of a cylinder is better, but to recognize it as part of a pipe of a certain size with specific end connections allows the generation of useful CAE models of existing plants.

Pattern recognition by means of feature extraction is well known in the art and is the general term applied to the process of recognizing complex objects based on primitive or simplified representations. Recent advances in this field have led to numerous applications of neural network techniques and architectures in commercially available software and progress in related research.

The problem to be solved in any recognition process is firstly the ability to distinguish and recognize the assigned features, and secondly to do so in the presence of disturbances such as noise or artefacts in the raw data, faulty data, or partially missing data. The first aspect of the recognition task may involve more than merely detecting the presence of a certain object at a particular location. Depending on the type of entity to be recognized, it may also be necessary to recognize further auxiliary features or parameters, such as the orientation or size of the object. The difficulties introduced by the second aspect of the recognition task have a detrimental effect on the quality of the first aspect, causing errors or partially incorrect solutions that need to be tested, confirmed, reworked, and optimized. Some type of confirmation mechanism would be advantageous to ensure that the proper solution is found.

Pattern and object recognition by means of successive computation steps generally begins with the loading of an input dataset into a pre-defined set of input variables or units which constitute the lowest recognition layer. During the recognition process, each recognition unit in higher layers generates a response based on the values or responses of a selected subset of units in lower layers (receptive field). The number of layers used, the sizes of the receptive fields, and the rule used by each recognition unit to compute its response vary depending on the type of information to be recognized, that is, the complexity and number of the patterns, and the intermediate features that must be recognized to successfully identify the overall pattern. Sufficiently fine-grained intermediate features, overlapping receptive fields, and strongly converging data paths enable distortion-invariant and position-tolerant recognition.

In commonly available similar recognition systems, the structure and dimension of the recognition layers are generally fixed during the recognition process, requiring that each layer contain enough recognition units or cells to fill the N dimensions of the recognition space in the required resolution. For cases where N>2 the resulting large number of cells makes a computation of the cell responses unfeasible. The process becomes inefficient particularly where the input data is sparsely distributed throughout a large input space.

The feature extraction process itself is intended to solve the problem of recognizing objects from input data that is partially missing or noisy. As detailed by Fukushima, the simple lower-layer representation of the object is replaced by the more intelligent, meaningful and detailed representation in higher recognition layers. This step can succeed if there are merely enough lower layer features present to initiate or suggest the appropriate higher-layer response, and if there are no conflicting or contradicting responses generated. In existing methods, the resolution of conflicts among members of the higher recognition layers is resolved by simple response magnitude comparisons—the stronger response, or the response representing the greater number of lower-level features is considered the winner. The losers, which nevertheless represent some aspect of the recognizable features, are generally neglected. There is generally no procedure to reintegrate or reform the seemingly incorrect responses into the general recognition solution.

Isshiki describes an optical character reading system in which a given character is read several times to produce multiple result signals, from which group the final result is determined by the most frequent occurrence of the same signal. That method actually temporarily generates the above mentioned multitude of response elements which the current invention seeks to avoid by generating cells only where there is data to recognize. Furthermore, the technique of generating a multitude of overlapping responses is well known in the art and is not an aspect of the present invention.

Maney describes a recognition technique in which multi-bit fields are collected into groups but has no provision for confirming the initial grouping based on the results of later or higher groupings. That method also lacks a mechanism for ensuring or at least facilitating that the lower-level multi-bit fields (which are analogous to the cells in the current embodiment) are collected into compatible groups. Furthermore, the method described by Maney finds the same pattern on all levels of the hierarchy and does not construct the final solution from collections of intermediate solutions. It is designed to detect the presence of a given signature somewhere within a larger signal space, and not fully interpret, organize, and structure all of the components of signals that may be present in the signal space. Furthermore the hierarchical grouping represented in FIG. 2 of U.S. Pat. No. 5,295,198 is an arbitrary grouping that is as such not necessary for the solution of the problem and does not represent a distinguishable point in a recognition hierarchy. The process of dividing a signal space into many subsets and recombining those subsets in various groups is well known in the art and was described by Fukishima to provide his Neocognitron network with the ability to recognize patterns independently of their location in the signal space. Furthermore the system described by Maney bases on a discretization of the recognition space, (as evidenced by the spatial cells which make up the parameter space his pattern recognizers use) which the present invention avoids by generating recognition cells where there is data to recognize.

Filipski describes a method of statistical pattern recognition in which a hierarchical structure is generated to assist in the decision process involved recognizing various classes of objects. The classes used therein are however not structured in their nature in that the constructed hierarchy does not imply a hierarchy of content but only a hierarchy of procedure or order of processing. Therefore it is not necessary to establish a mutually fortifying relationship between pairs of hierarchical levels and there is no ownership relationship between elemental members of the different levels. It is therefore also not possible to implement the bottom-up/top-down information flow which is the subject of the present invention.

Kuratomi et al. describe a neural network system for the recognition of twodimensional images which also is based on multi-layer feature extraction and represents the standard art described earlier by Fukishima. This method however does not generate recognition elements where there is data to recognize, but covers the recognition space with an independent grid which is fully populated with recognition elements. The described method also does not provide for the top-down information flow of the present invention.

BRIEF SUMMARY OF THE INVENTION

In practical recognition applications, the data domain in three-dimensional or higher dimensional space is sparsely populated in that the data typically does not fill out the space. The standard technique of discretizing the space into a multitude of subdivisions results in enormous amounts of virtual data points of which few are actually filled with relevant data.

It is an object of the present invention to provide a method by which the responses of the relevant cells in the higher recognition layers can be efficiently calculated without performing trivial calculations that contribute nothing to the solution.

In practical applications, the data available to recognition systems contains noise and faulty data points which makes the recognition process more difficult. Such disturbances lead to partially faulty or defective recognitions, which generally are corrected or compensated by oversampling and averaging.

It is a further object of the present invention to provide a feedback mechanism for confirming and strengthening the correct recognitions by means of interactions between the recognition layers and weakening the incorrect or inconsistent interim recognition results.

In practical applications where the input data is generated by a 3-dimensional laser scan, the data often is simply missing in portions of the scanned space. This may result from portions of the scanned objects being situated in an area that lies in a shadow behind another object, or being poorly accessible from all sides, or simply from the use of insufficient scanner viewpoints to adequately illuminate all objects of interest. All such effects lead to objects being only partially represented in the scan data, requiring the recognition process to infer the existence of the entire object from a subset of its surface.

It is a further object of the invention to facilitate the recognition of partially occluded objects by enabling a partial set of lower-level features to effect a higher level recognition, and to have the higher level recognition, which at first has the character of a conjecture or hypothesis, be tested and confirmed by a feedback mechanism to increase the confidence in the higher level recognition results.

In a method and system for the implementation of multi-layered network object recognition in N-dimensional space, the structure of a neural recognition network is dynamically generated and adapted to recognize objects.

The recognition network comprises recognition cells organized into groups called layers. The layers contain the cells in that a cell of a given layer can only represent the objects assigned to the layer and the cells do not migrate between layers. The cells themselves are simply idealizations of the recognition of a certain object at a certain point in the N-space of the recognition, domain and are characterized by a position coordinate and possibly an orientation and various size parameters. The cells are not predefined subsets of the recognition space (as are for example pixels of an image) but are dynamically generated by the recognition method and may occur in clusters of increased density where needed or may be absent altogether in a given portion of the recognition space.

The layers of the network are capable of recognizing key features of the input data by using evaluation rules to establish a hierarchical structure that can adapt to data position and orientation, varying data densities, geometrical scaling, and faulty or missing data. Based on successive hierarchical feature recognition and synthesis, sufficient relevant recognition cells are generated to enable data processing and information propagation through the recognition network without generating or computing unnecessary irrelevant cells.

A network hierarchy is defined and constructed comprising a succession of recognition layers which each can contain a collection of nodes or, cells. The number of cells present in a given layer varies during processing, and each layer is initially equipped with zero cells. Each layer, recognizes a specific group of key features, and the cells in the layer are used to represent the presence and characteristics of the features. The layers are interlinked by ownership-type relationships (20 in FIG. 4) in which a cell in a given layer is said to own a group of cells in a subordinate layer, and this subordinate group of cells is said to constitute the receptive field of the superordinate cell. This owner-subordinate relationship is repeated between each pair of successive layers from the lowest input layer to the final uppermost recognition layer. This final layer represents the answer to the overall recognition problem in that its cells recognize and represent the key features that uniquely classify the pattern imposed on the input layer.

All layers have the following properties:
  Each layer represents an abstraction level of the object to be recognized, with the complexity of the abstraction being greater in the higher layers.
  Each layer is equipped with a set of key features that characterize an aspect or property of the object to be recognized, with said features being computable by examining the properties and responses of a subset of cells in the subordinate layer.

Each layer is equipped with a rule or algorithm for determining whether a subordinate layer cell contributes positively or negatively to the recognition process carried out in said layer, specifically, a means of determining whether the inclusion of a given subordinate cell in the receptive field of a given superordinate cell is advantageous to the recognition function of the superordinate cell.

All cells further have the following properties:

Each cell has a fuzzy response polarization vector which indicates the cell's recognition of the features which are key to the layer containing the cell.

Each cell has a collection of pointers representing references to a subset of cells in the layer subordinate to the layer containing said cell, collectively called receptive field, and a corresponding collection of weights.

Each cell has a single pointer representing a reference to a cell in the layer superordinate to the layer containing said cell, called owning cell.

Each cell has auxiliary variables containing computed geometric information such as unit normal vector, centroid, and orientation direction which give details specifying the object represented, by the cell.

The computation process may be subdivided into an initial construction phase, a convergence phase, and a final termination phase. It is possible to implement a purely convergent process that functions adequately for the initial network construction and for the final cleanup, however, it is preferable and more efficient to specialize the beginning and end phases to optimize the effects of the convergence phase. The description below of the initial network building process is therefore very similar to the process termed "synthesis" used later during the convergence phase.

During the entire computation process, operations on the neural network are performed in which cells in the various hierarchical layers may be created and destroyed, linked and unlinked with owners, and assigned to and removed from receptive fields in an iterative convergent process that can implement neural network recognition techniques that result in a final collection of cells that adequately represents the object to be recognized in the various hierarchical layers. This final structure is both a hierarchical map of the input data as well as a network capable of recognizing the key features of the input data. Information flows between neighboring layers in both bottom-up and top-down directions during the convergence process: superordinate cells extract features by evaluating the properties of the subordinate cells in their receptive fields, and subordinate cells base their membership decisions, receptive field sizes, and evaluation parameters on information from the superordinate layer cells. Recognition occurs when the top-down signals and bottom-up signals are sufficiently mutually fortifying to establish a persistent stable activation level of all involved cells; at this point the iterative process has converged to a solution. This global solution convergence is driven by the grouping of cells into receptive fields such that the features of the grouped cells are similar to each other and are compatible with the owning cell in the next higher layer. The achievement of this state indicates not only that all conditions defining the quality of the representation on all levels are sufficiently fulfilled that recognition is confirmed, but also that the hierarchical structure of the network is valid and represents a valid overall solution.

The computation process is initiated by transferring the input data into the lowest hierarchical layer (the input or first layer). Typical input data may consist of simply a list of coordinates and a physical property that has been measured at that coordinate. In the case of laser scan data, a single input cell may be generated for each scanned data point to contain that data points spatial coordinates, thereby fully representing the input data with zero information loss.

Each superordinate layer is initially constructed by means of an appropriate rule or algorithm for grouping the cells of its subordinate layer. Thus, the next major step necessary after loading the input data into the input layer is the construction of the layer 1 cells by means of the grouping algorithm. In principle, the input layer cells (layer 1) are divided into a number of spatially compact groups, a new layer 2 cell is generated for each group, the receptive field pointers of the layer 2 cell are set to point to the cells in the group, and the cells in the group become owned by the new layer 2 cell. This initial grouping into receptive fields will be repeated as each new layer is constructed, and, although the iterative solution process converges despite ill-defined initial groupings, a well-planned initial grouping speeds convergence. The grouping algorithm has no detrimental effect on existing cells and ownerships and may therefore be used at any time during the recognition process when it becomes necessary to generate new ownerships of subordinate layers.

The iterative solution process may begin at any time after the first two layers have been constructed, and may continue throughout and after the successive construction of all remaining layers. Alternatively and more preferably, the iterative solution process begins after all layers have had some cells generated to represent groupings of cells in their subordinate layers. The iterative solution process basically comprises two groups of operations: those in which information flows from a given hierarchical layer to the next higher hierarchical layer, and those in which information flows to the next lower hierarchical layer. The former serves to construct and optimize the higher layers based on the lower layers and will be termed "synthesis"; the latter serves to enforce the features which have been recognized by the higher layers upon the lower layer cells and will be termed "analysis". The iterative process may implement whatever neural network recognition techniques are appropriate to the key features of the relevant layer, generally simple analytical formulae in the lower layers, and more complex pattern recognition algorithms in the higher layers, but always driving toward a stable state of mutual inter-layer reinforcement. In addition, during the iterative solution process, receptive field sizes and recognition parameters are adjusted, cells may reselect the receptive field to which they belong based on new information from higher layers, and cells may even find there is no existing receptive field they wish to join. Superordinate cells are created as required to overtake ownership of orphaned cells, and are destroyed when their receptive fields have atrophied beyond a predefined limit. This mechanism guarantees not only the creation of a persistent mutually reinforcing hierarchical network structure, but also the destruction of errant intermediate results and the reassignment of the complicit cells. Generally the mode of functioning is that many solutions are initiated of which only a subset are correct The flexible dynamic structure has the following advantages:

Cells are generated only where there is data to recognize; the absence of data is represented by the absence of cells. The generated neural network adapts naturally to the dataset being recognized.

Receptive field sizes are dynamic and membership criteria are based on rules, allowing receptive fields to adapt to varying data densities and geometric scaling of key features (the network is scale invariant)

Since, through the process of mutual reinforcement, the response of superordinate cells is activated by the presence of merely sufficient supporting subordinate cells, and not necessarily all conceivable supporting cells, the recognition process succeeds despite faulty, noisy, or missing data, or even despite errors in the recognition of a minority of cells in lower layers (the network is fault-tolerant)

Since recognition cells are constructed where the data is found, a spatial translation of input data has no effect whatever on the ability of the network to recognize the assigned patterns (the network's recognition is position-invariant)

Since the network exhibits fault-tolerance at each recognition layer, and thereby at each abstraction level, the network is capable of compensating for each way in which the data may differ from the recognition ideal (the network's recognition is distortion-invariant).

BRIEF DESCRIPTION OF THE DRAWINGS

FIGS. 1 Through 3 Describe the Basic Structure of the Recognition System

FIG. 3 shows the definition of the representation of the cells of the various layers.

FIGS. 4, 5, 6a and 6b Show Details of the Operation of the Recognition System

FIG. 4 shows details of the bottom-up and top-down information propagation through the network.

FIG. 5 shows the entire construction, optimization, and finishing sequences that are carried out during the recognition process.

FIGS. 6a and 6b show the effect of applying the top-down bottom-up information flow to a difficult recognition problem.

DETAILED DESCRIPTION OF THE INVENTION

A typical problem well-suited for this network algorithm is 3-dimensional object recognition using as input data a set of 3-dimensional coordinate points representing random points on the surface of the object to be recognized. Such a dataset could be generated, for example by a laser scanning device capable of detecting and outputting the 3-dimensional coordinates of its observed scan points. A simple example of scan data is shown as 8 in FIG. 2 for a small cylindrical section. In the current implementation, the input data consists of a 3-dimensional laser scan of portions of industrial plants, generated by laser scanning devices that are positioned at various points in the plant and allowed to scan in all directions from each vantage point, generating datasets called point cloud data. The individual scan datasets are corrected for the position of the vantage point so that all scans can be combined into a single consistent point cloud dataset. Such combined point cloud datasets contain more than one billion data points for an average-sized industrial plant and are far too voluminous to handle easily within current engineering software.

The current implementation of the recognition method uses a system of 5 layers abstracted as shown in FIG. 3 and summarized here:

Layer 1: 3-D Point
Layer 2: Nearly-flat surface patch [spatially limited by an effective radius of influence]
Layer 3: Geometric primitive (cylinder, flat, edge, sphere) [also spatially limited by an effective radius or spatial extent-of-influence]
Layer 4: Geometric complex (multiple primitives: tube, face, toroidal section, profile) [spatially self-limiting with in some cases a variable length]
Layer 5: Intelligent 3-d object (pipeline, vessel, building component) [spatially self-defining]

Figures 1A, 1B:
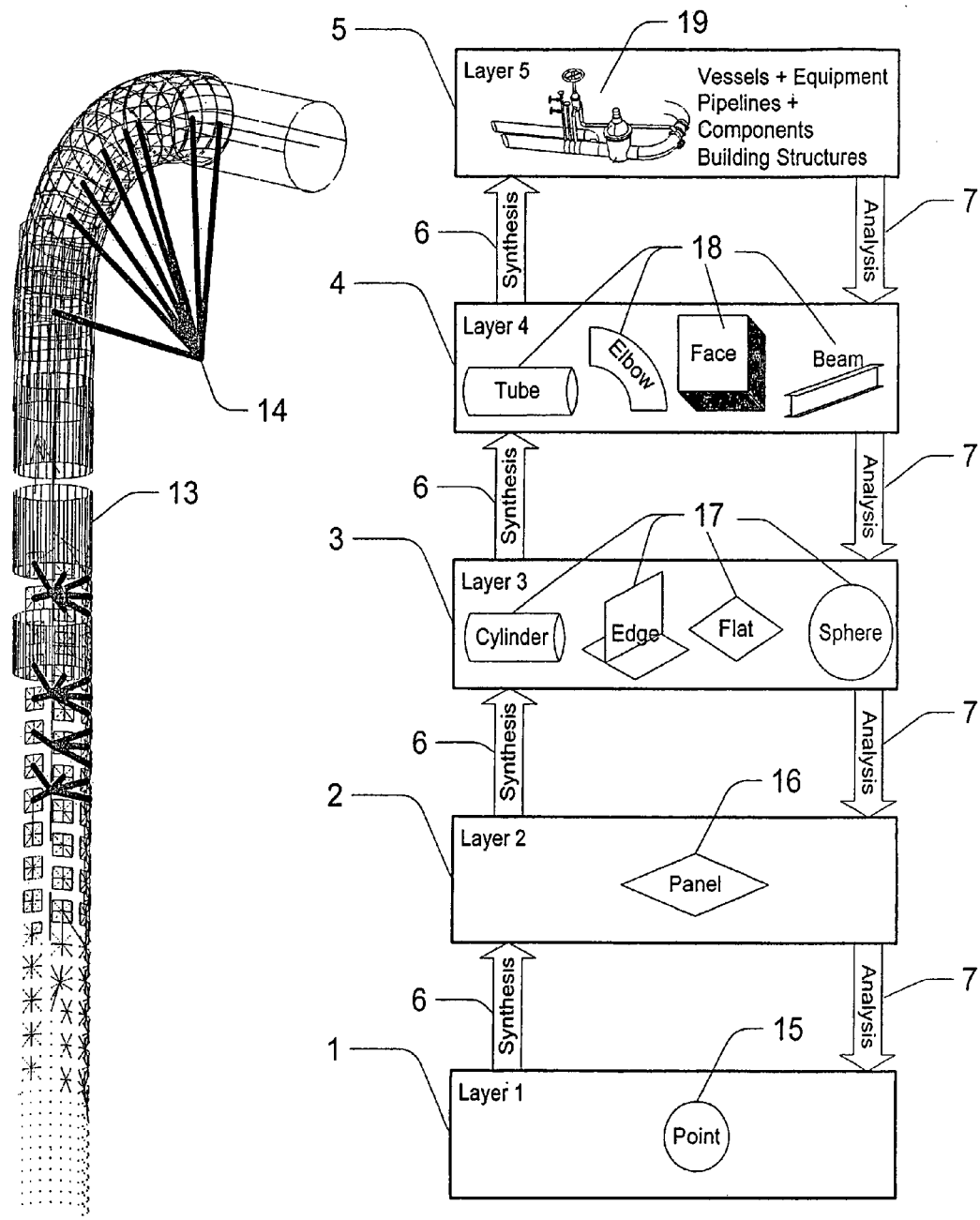
FIGS. 1a and 1b give an overview of the arrangement of the layers of the neural network, the ownership relationships, and the components of the network affected during network construction and during the convergence of the recognition process.
Figure 2E:
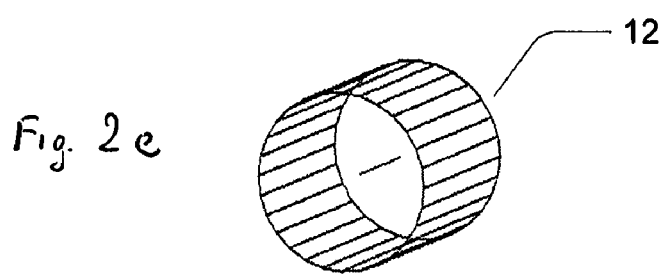
FIGS. 2a to 2e show the application of the network structure to the simple case of a short cylindrical element to illustrate the types of network cells and their spatial relationship to one another.
Figure 2D:
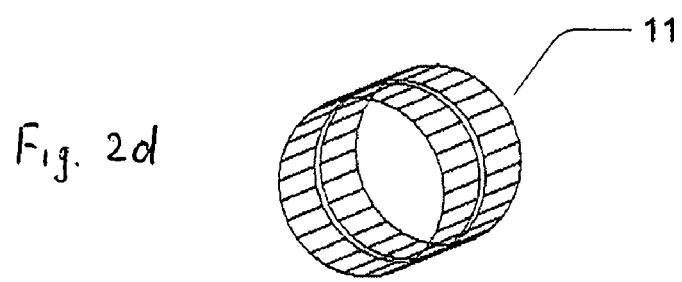
Figure 2C:
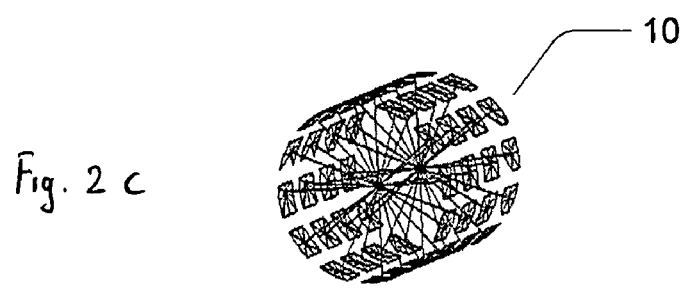
Figure 2B:
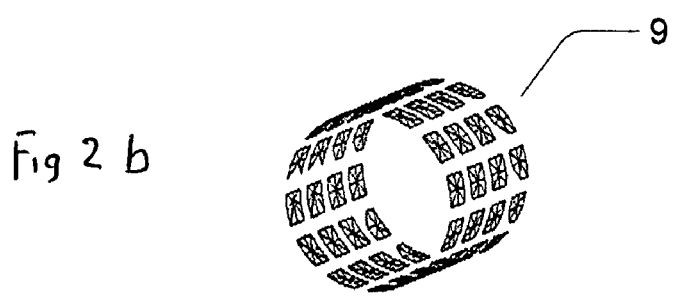
Figure 2A:
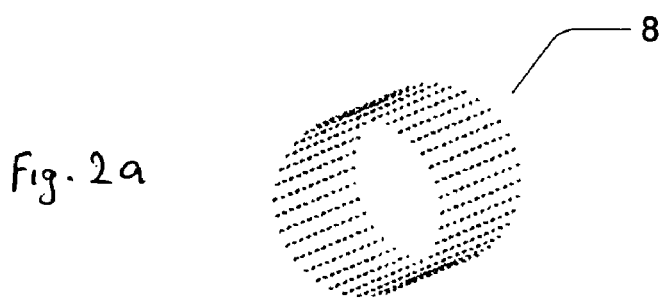
Figure 6A:
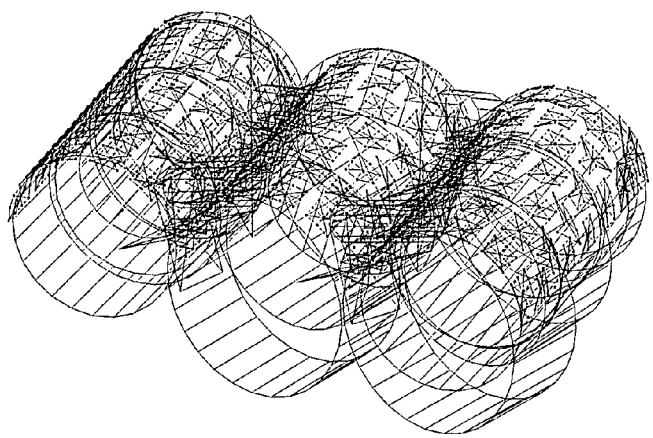
Figure 6B:
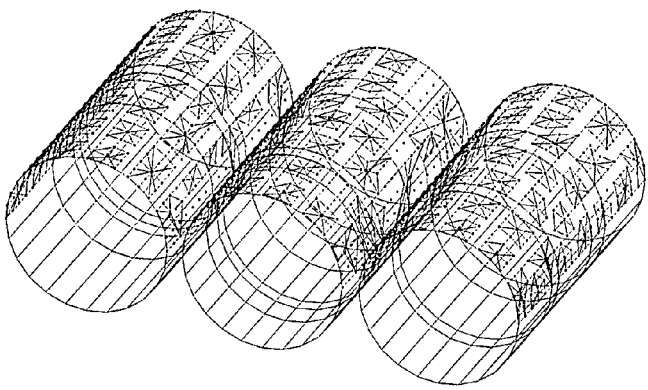

In the first step via links 21 in FIG. 4 of the recognition process, the input layer 1 (1 in FIG. 1) of the network is filled with input data such that one input layer cell 15 is generated for each scanned laser point and assigned the spatial coordinates of the scan point. A cell in this layer can only represent a spatial point (shown as 8 in FIG. 2), therefore its polarization vector degenerates to only one component which always has the trivial value of 1.

The next step 6 constructs layer 2 (2 in FIG. 1) by finding an unowned layer 1 cell, generating a new layer 2 cell (16 in FIG. 1b) as its owner, and searching in the neighborhood of the previously unowned layer 1 cell for other, unowned layer 1 cells that can be added to the receptive field of the new layer 2 cell. This process is repeated until there are no unowned layer 1 cells. A layer 2 cell in this implementation can only represent a small surface patch locally approximated as flat, and therefore also has a polarization vector that degenerates to a single component which always has the trivial value of 1. Such surface elements are shown as 9 in FIG. 2.

At this point, layers 1 and 2 have been constructed with ownership links, and it is now possible to perform the first optimization. First, each layer 2 cell now has a group of layer 1 cells which it owns and which form its receptive field. From these cells, the layer 2 cell can evaluate itself and recognize the features it is assigned to recognize. Since the cells of layer 2 are intended to represent flat surface patches or panels, they can be appropriately represented by the coordinates of their centroid and by a 3-dimensional vector representing the surface normal at the centroid, whereby these values can be computed by simple analytical formulae applied to the layer 1 cells in the receptive field. Once the layer 2 cells have been evaluated, the rule can be applied which judges the contribution of a layer 1 cell to the recognition process of the layer 2 cell to which it belongs. Since a layer 2 cell represents a flat surface panel, a layer 1 cell contributes poorly or detrimentally to the recognition process of the layer 2 cell if it does not lie in or near the plane represented by the layer 2 cell. In such case, the layer 1 cell is removed from the receptive field of the layer 2 cell and allowed to search for an other more appropriate layer 2 cell to join. If that search is unsuccessful, the orphaned layer 1 cell may initiate a new layer 2 cell to own it. During successive iterations, that newly generated receptive field, which at first contains a single layer 1 cell, may grow by the acquisition of other layer 1 cells that are rejected from the receptive fields of nearby layer 2 cells. The final state of layers 1 and 2 is such that each layer 1 cell is owned by a layer 2 cell, and each layer 2 cell has a well-defined receptive field with members that support the decision of the recognition process carried out by the layer 2 cell. In addition, all input data has been processed without loss of information, in that each input data point has generated a layer 1 cell, and each layer 1 cell has been given the opportunity to represent the surface to which it belongs in the layer 2 cells representing surface panels.

Next the layer 3 cells (3 in FIG. 1) are constructed by a similar process: for each unowned layer 2 cell, a new layer 3 cell (17 in FIG. 44 is created and allowed to search for further receptive field members. Since the layer 3 cells can represent various types of surface elements, including curved surfaces, they have additional properties or parameters to represent the features unique to this recognition layer (strength of curvature, that is, radius of curvature, and curvature orientation) and a four-compontent polarization vector to indicate the type of surface represented (flat, edge, cylindrical, or spherical). In the case of the small cylindrical element example of FIG. 2, layer 3 contains two cells which each represent a short portion of the entire element and are shown as 11 in FIG. 2. The ownership links between cells of layer 3 and cells of layer 2 are shown as 20 FIG. 4. The subordinate layer 2 surface patches owned by these two layer 3 cells are indicated by the clustered radial lines in 10 in FIG. 2. There are two clusters which have formed at the points which represent the origins of the two layer 3 cells.

The additional parameters and properties of the layer 3 cells can be computed from the cells of the receptive field, and the layer 3 cells can be optimized by an iterative process as was done for the layer 2 cells. In the present embodiment, a layer 3 cell is initiated in the same way as a layer 2 cell, namely in that adjacent subordinate cells are collected and an analytical algorithm is applied to determine the parameters of the best-fitting layer 3 cell. In the case where that layer 3 cell turns out to be identified as a cylindrical element, for example, the position of the cylinder axis can be found by finding the intersection of the normal vectors of the constituent layer 2 cells and the radius is given by the average distance between the axis and the centroids of the layer 2 cells. To make the determination whether a new layer 3 cell is actually a cylindrical element, a flat, an edge, or a spherical element, the present embodiment simply builds a prototype of each of these layer 3 cells, optimizes the parameters of the prototypes, and then computes the total error given by the sum of the distances between the ideal surface of the prototype cell and each layer 1 cell owned by the layer 2 cells owned by the new layer 3 cell. The prototype with the least total error is considered the winner and the new layer 3 cell is then classified as that type by setting its polarization vector correspondingly.

The conditions for membership in the receptive field of a layer 3 cell differ, however, from the conditions for membership in the receptive field of a layer 2 cell. Since layer 3 cells may represent curved surfaces or edges, they must be more flexible in their selection of receptive field members, also allowing layer 2 cells to join that have their centroids located near a characteristic surface specific to the layer 3 cell. On the other hand, layer 3 cells may impose new membership conditions on layer 2 cells, for example requiring that the surface unit normal vector of the layer 2 cell be oriented in a certain direction depending on the location of the layer 2 cell in the receptive field of the layer 3 cell, or requiring that the receptive field of a layer 2 cell lie adjacent to the receptive field of another layer 2 cell that is already a member of the layer 3 cell's receptive field before allowing membership.

Layer 4 cells (4 and 18 in FIG. 1) are then generated and optimized analogous to layer 2 and 3 cells. Layer 4 cells are built up from the features of layer 3 cells, and represent long cylindrical segments ("tube"), toroidal sections ("elbow"), flat areas bounded by an edge ("face"), and whatever other geometric primitives are necessary to represent the objects found in the input data. Layer 4 cells again contain properties or variables not found in layer 3 cells to assess the key features detected, and a multi-component polarization vector to specify the type of object the layer 4 cell represents. In the example of the small cylindrical element, the two layer 3 cells which represent short cylindrical sections are grouped together as subordinate cells of a single layer 4 cell shown as 12 in FIG. 2. In the example of the bent pipe of FIG. 1, several layer 4 cells are generated, one of which turns out to be a tube shown as 13 in FIG. 1 and one of which turns out to be an elbow and owns several cells on layer 3 which represent short cylindrical elements. The layer 4 elbow cell has its origin at 14 in FIG. 1 where the ownership lines are clustered.

The polarization vector of a cell is a fuzzy membership vector indicating the degree to which the cell belongs to one of the recognition categories and serves to assess the compatibility between cells of differing layers. In the example of the layer 3 cells mentioned above, the polarization vector tends toward one of the following states:

[1 0 0 0]=Plane
[0 1 0 0]=Edge
[0 0 1 0]=Cylinder
[0 0 0 1]=Sphere

During the initial construction of the layer 3 cells, the polarization vector is set to [1 1 1 1] meaning that the cell is simultaneously a flat plane, an edge, a cylinder, and a sphere. As the cell acquires subordinate cells and reevaluates itself, the polarization vector is refined and asymptotically approaches one of the states listed above.

The polarization vector is used in conjunction with a compatibility matrix to efficiently assess the utility or feasibility of including a given layer 2 cell in the receptive field of a given layer 3 cell. This is carried out by multiplying the polarization vector of the layer 3 cell with the compatibility matrix and with the polarization vector of the layer 2 cell:

Compatibility=

$$P_3 \cdot X_{32} \cdot P_2 = [\rho_{PLANE} \ \rho_{EDGE} \ \rho_{CYLI} \ \rho_{SPHERE}] * \begin{bmatrix} 1 & 0 \\ 1 & 0 \\ 0 & 1 \\ 0 & 1 \end{bmatrix} * \begin{bmatrix} \rho_{FLAT} \\ \rho_{CURVED} \end{bmatrix}$$

The resulting value indicates whether the layer 2 cell is a suitable receptive field cell for the layer 3 cell. The polarization vector is used in the current embodiment at various points in the recognition algorithm, for example when it is necessary to estimate the nature of a superordinate cell based on the polarization vectors of its subordinate cells, or when it is necessary for a subordinate cell to assess whether a potential owner is compatible. This simple compatibility computation by means of the compatibility matrix can be adapted to work with any type of layer definitions.

The current embodiment begins the iterative recognition process (22 in FIG. 5) after all layers from layer 1 to layer 5 (5 in FIG. 1) have undergone the initial construction phase (6 in FIG. 5). As implemented, the iterative algorithm simply steps through the layers of the network successively from top to bottom and then from bottom to top, however the individual steps can be carried out independently of one another and could be implemented as separate threads running on multiple processors. The iterative algorithm consists basically of two components, synthesis and analysis, shown as 6 and 7 in FIG. 1. Synthesis between two adjacent layers generally constructs or enlarges or optimizes superordinate cells based on the subordinate cells whereas analysis modifies or disowns or destroys subordinate cells based on the superordinate cells. The effect thereby achieved is that partial solutions that are correct are permitted to grow and improve and partial solutions that are faulty or ill-posed are weakened or destroyed.

Partial solutions in any layer are deemed correct if they lead to further solutions in higher layers. A converged complete solution is thus by this definition one where all lower-level partial solutions are consistent with the higher-level solutions in which they are contained, and where no more partial solutions can be generated (because all present solutions account for, all of the layer 1 data points).

Top-down information flow may contribute to the recognition process at this point in the following way: once it has been determined that, for example, a layer 3 cell probably represents a cylinder and the radius of curvature has been computed, it becomes clear which portion of space near that cell is expected to contain subordinate layer 2 cells that should belong to that cell and which portion of space cannot belong to that cell. For the purpose of recognizing and evaluating the layer 3 cylinder, it is not necessary and makes no sense to include information from points that are a distance of more that twice the computed radius of curvature away from the computed center. Thus it is possible for a layer 3 cell to restrict the size of the receptive fields of the layer 2 cells it owns to a certain value, and to instruct the layer 2 cells to reevaluate themselves based on this new information. This is an example of how a decision made on a higher-level layer has consequences on subordinate layers and how such higher-level intermediate results are cascaded to lower-level layers.

The synthesis and analysis components of the iterative solution are themselves made up of several smaller computational steps which also can be carried out independently at any time since any modifications they make to the network are an improvement and never a detriment (although it may be more effective and faster to perform them in a certain order). In the current embodiment, synthesis includes Condense—the generation of new superordinate cells to own unowned cells from the subordinate layer Reevaluate—the recomputation or recognition of superordinate cells based on the owned subordinate cells Grow—the expansion of existing superordinate cells by the acquisition of unowned cells from a subordinate layer Reselect Owner—the reassignment of a subordinate cell to a different, more fitting owning cell Spawn—the conjectural generation of new cells near existing cells based on features of the existing cells Merge—the unification of two superordinate cells whereas analysis includes Cascade—the correction of parameters of subordinate cells based on the parameters of the superordinate cells Prune—the disowning of subordinate cells from a superordinate cell Filter—the destruction of cells that are no longer considered viable The iterative algorithm comprising alternating sequences of synthesis and analysis is repeatedly carried out, possibly with simultaneous adjusting of some decision parameters, until the network no longer changes. The achievement of a final solution with meaningful objects on the highest layer depends on how well the available objects of that layer have been defined and whether they are sufficiently represented in the input layer data to account for all of scan data points supplied. In the current embodiment, the specific purpose of the network is to recognize industrial plant elements consisting of machines, equipments, pipelines, and steelwork. Disturbances in the scan data that do not fall into one of these categories are not recognized in that they generate no representative cells on the highest network layer. These disturbances do, however, generate intermediate solutions on lower layers, since the disturbances themselves may consist of the same primitive geometric shapes that are later recognized as constituents of plant components. The algorithm recognizes a disturbance as such in that it generates valid intermediate solutions which remain unowned cells on some non-uppermost layer.

Once the recognition process has been run for several iterations and converged to a persistent solution, the layer 5 cells in this embodiment represent the final answer to the recognition problem in that they are abstractions of elements which are a more intelligent and more complete representation of the data than the original layer 1 data points. The cells of layer 5 are the entities that are suitable for transferring the desired information contained in the original point cloud data to an engineering software environment.

What is claimed is:

1. An object recognition method for implementing object recognition in an N-dimensional space by means of a network having layers of recognition elements (recognition cells contained within the layers, herein called layer cells), the layers being multiple layers, wherein the object recognition method comprises using a. the network having a multitude of the recognition elements grouped into the layers
      i. the layers being organized into a structure which represents a hierarchical order such that layers that are higher in the hierarchical order (higher hierarchical layers) have layer cells connected by links representing ownership to layer cells contained by layers that are lower in the hierarchical order (lower hierarchical layers),
      ii. the layers being assigned a multiplicity of certain key features which the layer cells in the assigned layers recognize and represent, with each layer being assigned a different unique group of features to recognize, with the lower hierarchical layers being assigned simple primitive features and the higher hierarchical layers being assigned complex compound features to recognize, with the features assigned to the higher hierarchical layers being more complex assemblages of the simple primitive features assigned to the lower hierarchical layers,
      iii. the layers being dynamic in size and in structure in that member layer cells are created or destroyed and links between layer cells of adjacent layers are created or destroyed so as to adapt each higher hierarchical layer to data generated by a next hierarchical layer and recognized by a hierarchical layer,
      iv. the layer cells having a polarization vector which indicates a type of feature which each layer cell has recognized if a layer cell represents more than one type of feature and which serves to determine whether said layer cells are compatible with layer cells of neighboring layers, and
      v. the layers being further equipped with a rule for determining whether layer cells of subordinate layers should be included in receptive fields of layer cells of higher hierarchical layers,
   b. the network being adaptive to the data in that the network represents content data by creating layer cells at locations where input data occur and tolerates an absence of layer cells where there are no data, as a result of a synthesis method which is applied to successive pairs of hierarchically adjacent network layers, where an adjacent layer which is lower in the hierarchical order contains layer cells representing recognition data and an adjacent layer which is higher in the hierarchical order contains no layer cells or insufficient layer cells to account for all of lower layer cells, which are of lower hierarchical layer, the synthesis method comprising the steps of:
  i. finding a layer cell on the lower hierarchical layer that is unowned,
  ii. generating a new owning layer cell on the higher hierarchical layer and assigning to the new owning layer cell ownership of the lower previously unowned layer cell,
  iii. finding all further unowned layer cells on the lower hierarchical layer in a neighborhood of the lower previously unowned layer cell (neighborhood layer cells) and assigning the further unknown layer cells also to the new owning layer cell, such that the new owning layer cell also owns the neighborhood layer cells, thereby forming a new larger group of owned layer cells,
  iv. reevaluating or rerecognizing the new owning layer cell based on the new larger group of owned layer cells, and
  v. repeating steps i through iv until there are no unowned layer cells on the lower hierarchical layer,
c. the network being further provided with an object recognition method training algorithm in which information flows through the network in both top-down and bottom-up directions to adapt each layer to a presence of layer cells, parameters thereof and a status of polarization vectors (recognition results) of hierarchically adjacent layers and induce convergence to a persistent robust solution, said object recognition method training algorithm comprising adapting, training and converging the network through an iterative process in which cell ownership is modified and layer cells are created or destroyed to converge distribution, parameters and polarization vectors of the layer cells to a final persistent stable state of mutual reinforcement which represents a solution to an object recognition task, said solution being embodied in, and defined by, the layer cells present in the highest layer of the network, said object recognition method being implemented by the steps of
  i. Data Input: copying input data to be recognized into the lowest hierarchical layer of the network,
  ii. Initial Construction: performing the synthesis method to successively construct preliminary elements on each next higher hierarchical layer from a previously-constructed next lower hierarchical layer of the network by means of analytical formulae and/or pattern recognition algorithms to account for all occurrences of patterns on the lower hierarchical layer, until an uppermost level in network hierarchy has been reached and populated with layer cells representing tentative solutions,
  iii. Analysis: for all pairs of cells for which an ownership relationship exists wherein a layer cell in the higher hierarchical layer owns a layer cell in the lower hierarchical layer, successively cascading recognition information from the layer cells of each higher hierarchical layer to owned layer cells in lower hierarchical layers, so as to sharpen and improve a state of accurate lower layer cells and to destroy or weaken poorly defined lower layer cells,
  iv. Synthesis: constructing new and modifying existing elements on each next higher hierarchical layer as was done in the initial construction step (cii) to again create sufficient elements on each layer to own all elements on each next lower hierarchical layer,
  v. Iterative Convergence: repeating the Analysis and Synthesis steps alternatingly until the network has converged and no longer changes, and
  vi. Output: reading the layer cells of the highest layer to an output as recognition results.

2. The object recognition method according to claim 1, wherein the links representing an ownership relationship between layer cells of differing layers are not actually destroyed and created but only deactivated or rendered inactive by setting a weighting factor to zero instead of actually removing the ownership relationship.

3. The object recognition method according to claim 1, wherein the links representing an ownership relationship between layer cells of differing layers are created not just between adjacent layers but also between non-adjacent layers to assist in the object recognition method.

4. The object recognition method according to claim 1, wherein the layers are not arranged linearly, but are arranged in a branched topology.

5. The object recognition method according to claim 1, wherein, for implementing a subset of the object recognition method various steps of the object recognition method are distributed among multiple hard- or software processing systems for improved performance.

6. A system for implementing an object recognition method as claimed in claim 1, comprising a non-transitory computer-readable medium provided with a program for implementing the object recognition method.

7. The system according to claim 6, wherein the network is adaptive to various content data which it represents and which are provided as a result of a creation of layer cells at locations where input data occur, the network however tolerating an absence of layer cells where there are no content data, such adaptivity being effected by a synthesis method which is applied to successive pairs of network layers for any two given adjacent layers where the lower hierarchical layer contains layer cells representing recognition data and the higher hierarchical layer contains no layer cells or insufficient layer cells to account for all lower hierarchical layer cells.

8. The system according to claim 6, wherein the links are provided representing an ownership relationship between layer cells of differing layers, the links being created not just between adjacent layers but also between non-adjacent layers to assist in the object recognition system.

9. The system according to claim 6, wherein the multiple layers are arranged in a branched topology.

10. The system according to claim 6, including an implementation of the object recognition system for distributing the implementation of various tasks among multiple hard- or software processing systems for improved performance.

* * * * *